United States Patent
O'Mahony

[11] Patent Number: 5,794,312
[45] Date of Patent: Aug. 18, 1998

[54] HOLDING DEVICE

[76] Inventor: Sean Patrick O'Mahony, 816 Green St., Alexandria, Va. 22314

[21] Appl. No.: 388,818

[22] Filed: Feb. 15, 1995

[51] Int. Cl.$^6$ ............................................. A44B 21/00
[52] U.S. Cl. ............................................. 24/3.3; 24/338
[58] Field of Search .................. 24/3.3, 3.11, 326, 24/327, 329, 331, 332, 334, 335, 338, 510, 564; 224/312, 247, 269; 248/902, 229.13, 229.16, 229.23, 229.26, 231.51, 231.81; 351/155

[56] References Cited

U.S. PATENT DOCUMENTS

| | | |
|---|---|---|
| Re. 12,771 | 3/1908 | Dripps . |
| 171,681 | 1/1876 | Meyer . |
| 305,185 | 9/1884 | Hawkes . |
| 463,786 | 11/1891 | Davidson . |
| 499,924 | 6/1893 | Keep ............................ 24/510 |
| 620,677 | 3/1899 | Schuck ........................ 24/510 |
| 727,204 | 5/1903 | Rogers . |
| 746,844 | 12/1903 | Jordan . |
| 760,040 | 5/1904 | Tatum ........................ 24/564 X |
| 1,350,612 | 8/1920 | Kreplin ...................... 24/510 X |
| 2,377,225 | 5/1945 | Gisleson ................... 224/312 X |
| 2,524,617 | 10/1950 | Wyse ....................... 224/312 X |
| 2,637,080 | 5/1953 | Nemser . |
| 2,818,621 | 1/1958 | Pretz . |
| 2,876,513 | 3/1959 | McIntosh . |
| 3,545,805 | 12/1970 | Wilson ....................... 24/332 X |
| 3,956,795 | 5/1976 | Kosakai . |
| 4,280,254 | 7/1981 | Racke ........................ 24/336 |
| 4,452,354 | 6/1984 | Tabachnick . |
| 4,458,384 | 7/1984 | Arnold . |
| 4,715,575 | 12/1987 | Kamerer ..................... 224/312 X |
| 4,771,515 | 9/1988 | Guarro . |
| 4,941,634 | 7/1990 | Gomes et al. ............... 248/902 X |
| 4,949,432 | 8/1990 | Wisniewski ................... 24/3.3 |
| 5,033,612 | 7/1991 | Bivins . |
| 5,082,225 | 1/1992 | Nespoli ...................... 248/902 X |
| 5,351,098 | 9/1994 | McDaniels et al. . |
| 5,408,728 | 4/1995 | Wisniewski ................... 24/3.3 |

FOREIGN PATENT DOCUMENTS

| | | | |
|---|---|---|---|
| 39192 | 8/1973 | Australia ................... 24/564 |
| 1162365 | 4/1958 | France . |
| 1579837 | 7/1969 | France . |
| 1162365 | 2/1983 | Japan . |

*Primary Examiner*—James R. Brittain

[57] ABSTRACT

A holder for eyeglasses and the like is provided. The holder is designed to be attached to articles of clothing, clothing accessories, automobile visors, or other areas whereby it is available for conveniently receiving and retaining a pair of eyeglasses. The eyeglass holder desirably can be rotated for awkward areas of attachment, or convenient areas of placement such as a purse strap. Notably, the holder can be pressed open by the wearer for ease of eyeglass temple bar insertion or removal. The holder can desirably have a releasable cover for a wearer to have a variety of choices of holder aesthetics. The holder broadly comprises of a clip or a pin, pivot, and hook arrangement; a cylindrical connection or a slit and guide connection; and a frontal elongate plate member pivotally mounted onto a base member; and, optionally, a removable cover.

6 Claims, 4 Drawing Sheets

HOLDING DEVICE

BACKGROUND

1. Field of Invention

The present invention generally relates to a holding device. More particularly, the present relates to a holding device for eyeglasses that can be attached to clothing, such as a shirt pocket, clothing accessories, such as waist belts or purse straps, and flat surfaces, such as automobile visors.

2. Description of Prior Art

Many people have poor vision requiring them to wear eyeglasses or spectacles. For these people it is frequently convenient to take their eyeglasses off and place them in a pocket. This is particularly true for those who are required by law to wear prescription eyeglasses while operating a vehicle but prefer to take them off and carry them when no longer operating the vehicle. Also, people generally pay high prices for designer sunglasses and prescription eyeglasses and then are forced to hide them in a pocket or in a purse when not in use. Lastly, people wearing sunglasses frequently take them off once indoors or leave them inside the automobile while not driving.

Whether putting one's primary eyeglasses, a pair of sunglasses, or extra glasses in a pocket is convenient, there are associated problems. The most obvious problem is that if the glasses are not held securely in a shirt pocket, they will fall out and break. Further, it would be advantageous if the eyeglasses could be held in a selected position or location such as outside a shirt pocket, thereby increasing the ease of access, preventing them from moving around (particularly while engaged in sporting events), and still display the expensive appeal.

The problem identified in the preceding paragraph is well known, particularly to those who use eyeglasses of various sorts. Various types of eyeglass holders have been disclosed in the prior art purporting to solve the problem. In U.S. Pat. No. 305,185 to Hawkes an eyeglass case having a clothing fastening means attached thereto is shown. Eyeglass holders that engage the bridge of a pair of eyeglasses are also disclosed in the prior art. Exemplary of this type of eyeglass holders are U.S. Pat. No. 727,204 to Rogers; U.S. Reissue Pat. No. 12,771 to Dripps; U.S. Pat. No. 2,637,080 to Nemser; and U.S. Pat. No. 2,876,513 to McIntosh. Eyeglass holders substantially formed from wire frame members have also been disclosed in prior art. U.S. Pat. No. 171,681 to Meyer discloses a wire frame having paired clamp hooks which engage the lens frames of the eyeglasses. U.S. Pat. No. 730,633 to Jordan discloses an eyeglass holder having a bent hook attached to a hair pin. In U.S. Pat. No. 3,956,795 to Kosakai an ornamental brooch having a slidably mounted wire frame attached to the rear surface of the brooch and extending downwardly for receipt of the temples of eyeglasses is shown. A curved wire frame eyeglass holder having end loops that engage the temples of eyeglasses is disclosed in U.S. Pat No. 4,458,384, to Arnold. A further example of the prior art is shown in U.S. Pat. No. 2,818,621 to Pretz where an eyeglass holder having a tubular member pivotally disposed below an ornamental pin for receipt of the temple of eyeglasses is disclosed. Eyeglass holders that engage the temple of an eyeglass by means of a moveable grip and a stationary grip are shown in U.S. Pat. No. 4,771,515 to Guarro. An eyeglass holder having a vertical transverse cross-section holding means to engage one temple piece is disclosed in U.S. Pat No. 5,033,612 to Bivins. Eyeglass holders with an actuating clamp to engage a temple piece is disclosed in U.S. Pat. No. 5,351,098 to McDaniels. An eyeglass holder folded into a U-shaped clip to push in eyeglass temples is disclosed in U.S. Pat. No. 4,949,432 to Wisniewski. An eyeglass holder folded into a U-shaped clip with an additional leg section folded into the clip to push in eyeglass temples is disclosed in U.S. Pat. No. 5,408,728 to Wisniewski.

OBJECTS AND ADVANTAGES

As can be seen from the foregoing, numerous devices have been considered to provide means for temporarily holding a pair of eyeglasses to clothing and the like. However, these devices of the prior art do not provide the advantages of the present invention. For an eyeglass holder to be most effective during almost any activity, it must be capable of simultaneously securing both temple pieces to prevent flapping of the eyeglasses which can damage the temple hinges while still engaged by the eyeglass holder. Securing both temple pieces should further prevent slipping out from the holder which can break the glasses. The eyeglass holder should be capable of receiving and securing a variety of eyeglass sizes and styles with minimal effort by the wearer. The eyeglass holder should be capable of being pressed open for insertion of the eyeglass temples to prevent scratching or damaging the eyeglass temples and to ease inserting the eyeglass temples, a feature especially needed due to the variety of positions and places the holder can be attached. The eyeglass holder desirably should be rotatable to increase the variety of placement positions of the eyeglass holder. Since the eyeglass holder is usually displayed by the wearer, it should provide an aesthetic appeal such as jewelry, and desirably, a means for changing the eyeglass holders'0 appearance as the wearers clothes and jewelry change. The eyeglass holder also should be inexpensive to manufacture. All these requirements are the objects and advantages fulfilled by the eyeglass holder of the present invention. Further advantages of the invention will become apparent from a consideration of the drawings and ensuing description.

DRAWING FIGURES

In the drawing figures, closely related figures have the same number but different alphabetic suffixes.

Figure 1A:
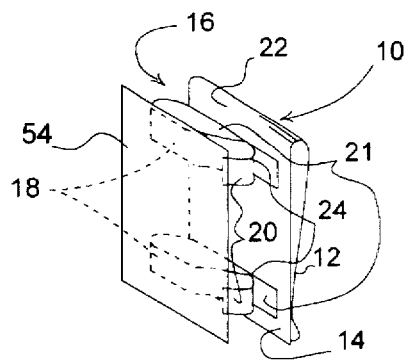
FIGS. 1A to 1E show an eyeglass holder With alternate embodiments of an article fastening means.

| Reference Numerals In Drawings | |
|---|---|
| 10 Article Fastening Means | 40 Guides |
| 12 Spring Clip | 41 Slits |
| 14 Base | 42 Urging Means |
| 16 Temple Holding Means | 44 Shaft |
| 18 Temple Clips | 46 Torsion Spring |
| 20 Clip End | 48 Fastening Lug |
| 21 Longer Clip End | 50 Parallel Fastening Lug |
| 22 Face | 52 Locking Ring |
| 24 Gap | 54 Plate |
| 26 Opening | 56 Compressible Supporting Element |
| 28 Cover | 58 Extended Shaft End |
| 30 Connection | 60 Receiver |
| 32 Recess | 62 Rails |
| 34 Nodule | 64 Snap |
| 36 Pivot | 66 Cut-outs |
| 38 Pin | 68 Notch |
| 39 Hook | |

DESCRIPTION

FIG. 1A illustrates in a perspective view a preferred embodiment of an eyeglass holder of the present invention.

The holder may be formed from many different materials or combination thereof. It is anticipated that either a metal may be used, such as silver, or a resilient plastic may be used for economic reasons. The holder comprises of an article fastening means 10, a temple holding means 16, and a plate 54. Article fastening means 10 is depicted as a spring clip 12, such as a money clip, having a generally rectangular side as a face 22, attached to temple holding means 16. Spring clip 12 is attached to temple holding means 16 by any suitable means, such as spot welding, soldering, or gluing. Temple holding means 16 is depicted as temple clips 18 separated by a distance of generally 1½". Temple clips 18 are generally S-shaped with longer free clip ends 21 extending along face 22 for attachment. Clip ends 20 of temple clips 18 extend perpendicularly towards plate 54 for attachment. This forms lateral gaps 24 near face 22 along a side of the holder for eyeglass temple insertion. Temple holding means 16 is attached to cover 28 by any means as previously mentioned such as gluing. Although plate 54 may take any variety of shapes and sizes, plate 54 is generally rectangular in shape having a flatlike surface for attachment of temple holding means 16 and small enough to allow the simultaneous insertion of both eyeglass temples of a set of folded eyeglasses through gaps 24 without obstruction to eyeglass lenses or hinges. Operation of the eyeglass holder in FIGS. 1A and 1E is accomplished by sliding spring clip 12 onto the top edge of a typical pocket. Plate 54 is pressed thereby pivoting on temple holding means 16 and opening gaps 24. With both eyeglass temples in a folded position, both eyeglass temples are inserted simultaneously through gaps 24. Because both eyeglass temples now can be secured instead of just one temple, flapping of the eyeglasses against a wearer's chest is prevented. Thus, temple hinge damage and constant repositioning of the second eyeglass temple piece is also prevented. Securing both eyeglass temples is a distinctive advantage of the present invention.

Figure 1B:
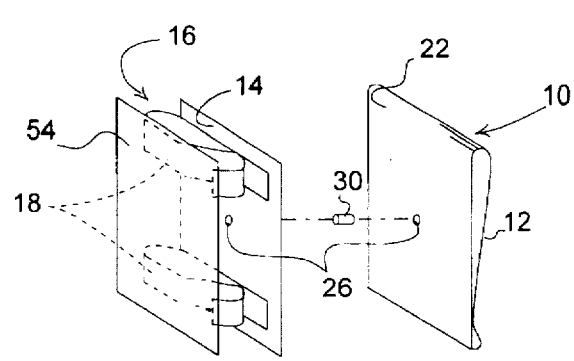

FIG. 1B depicts in a perspective view a second embodiment of article fastening means 10. Article fastening means 10 is attached to temple holding means 16 to allow rotation of temple holding means 16. Face 22 has a centerly positioned opening 26 for receiving a connection 30. Connection 30 may be formed from a small segment of cylindrical piping. Connection 30 is received by a centerly positioned opening 26 on a base 14. Although base 14 may take a variety of shapes and sizes, base 14 is generally rectangular and flat taking the shape and size of face 22. The tightness of base 14 against face 22 is such that, as base 14 were rotated to any position, excessive rotational movement would be prevented. Base 14 and face 22 may be secured onto connection 30 by any suitable means such as widening each end of connection 30 or placing locking rings, not necessarily illustrated, at each end of connection 30.

Figure 1C:
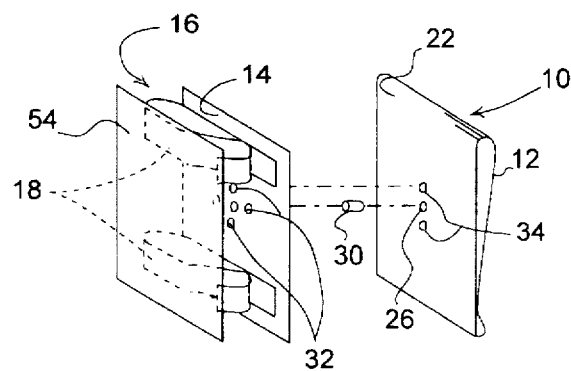

FIG. 1C depicts in a perspective view a third embodiment of article fastening means 10. Face 22 includes nodules 34 in a circular pattern around opening 26. Base 14 includes recesses 32 around opening 26. Nodules 34 are received by recesses 32 when face 22 and base 14 are received by connection 30. As base 14 is rotated about connection 30, nodules 34 are received into recesses 32 for consistent repositioning of temple holding means 16 to various angles by the wearer.

Figure 1D:
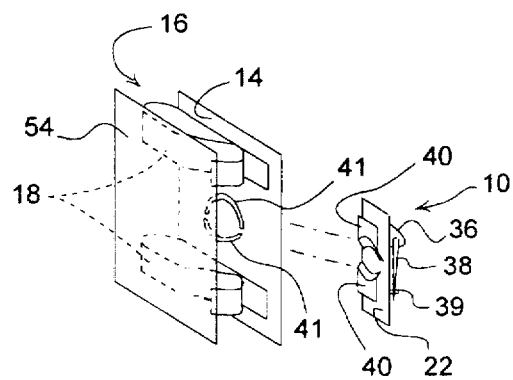
Figure 1E:
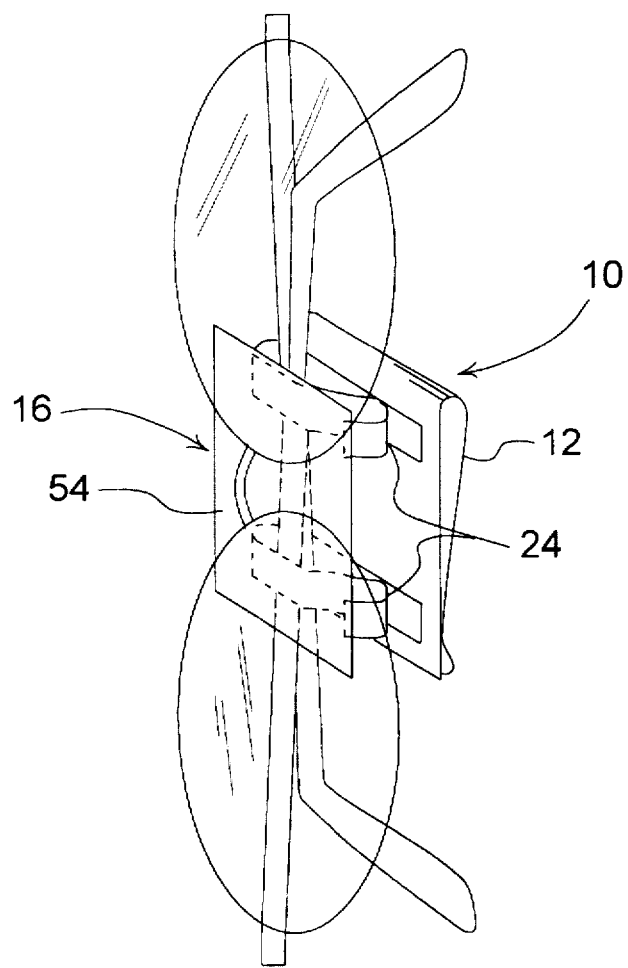

FIG. 1D depicts in a perspective view a fourth embodiment of article fastening means 10. Article fastening means 10 comprises of a pivot 36, a pin 38, a hook 39, and face 22. Face 22 has opposing L-shaped guides 40 perpendicularly mounted. Base 14 has semicircular slits 41 arcing about the center of base 14 for insertion of guides 40. Guides 40, once inserted through semicircular slits 41, are bent tightly onto face 22. Temple holding means 16 now can be rotated about article fastening means 10 and remain at the selected position without excessive play.

Operation of holders depicted in FIGS. 1B, 1C, and 1D is accomplished by rotating article fastening means 10 to the desired angle with respect to temple holding means 16. Then the holder is fastened onto an article, such as an automobile visor, and the temple pieces are inserted and secured as previously stated for FIG. 1A. This rotational ability is another advantage of the present invention since a purse strap also may be the desired attachment area. For example, referencing FIG. 1B, the spring clip 12 may be rotated 90 degrees with respect to temple holding means 16. Spring clip 12 may then be fastened perpendicularly to the purse strap. Because a purse strap is generally worn over a shoulder and parallel to a wearer's arm, temple holding means 16 is parallel to the arm, and thus also the eyeglasses. Advantageously, the eyeglasses now may be suspended securely, conveniently, and decoratively on the purse strap without causing obstruction to the arm.

The article fastening means of the present invention has been described as a spring clip, or a pivot, pin, and hook arrangement in the previous embodiments. However, an article fastening means may consist of numerous other devices such as an elongated pin and pin-cover arrangement or a leather strap and button arrangement. Further descriptions presenting these embodiments are common to the art and not deemed instructive.

Figure 2A:
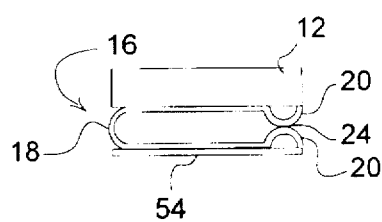
FIGS. 2A to 2E show an eyeglass holder with alternate embodiments of a temple holding means.

FIG. 2A depicts in a top plan view a second embodiment of temple clips 18. Temple clips 18 are generally U-shaped. Prior to the clip ends 20, are smaller U-shapes forming lateral gaps 24 along a side of the holder for eyeglass temple insertion.

Figure 2B:
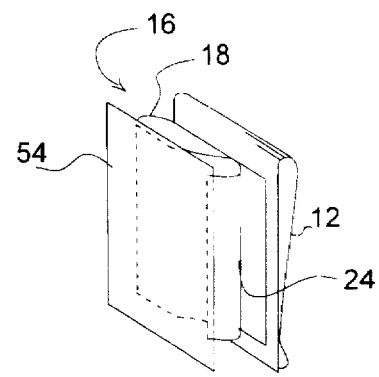
Figure 2C:
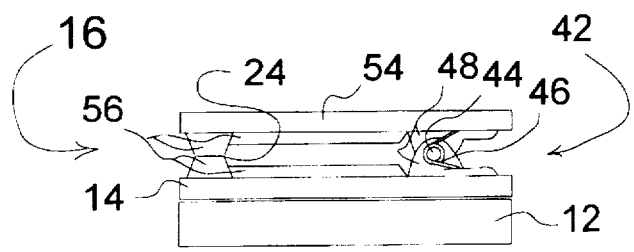

FIG. 2B depicts in a perspective view a third embodiment of a temple clip 18. The singular elongated temple clip 18 is generally shaped in the same manner as a temple clip 18 depicted in FIG. 1A. However, the length of the singular temple clip 18 extends approximately the distance between the top edge of the upper temple clip 18 and the bottom edge of the lower temple clip 18 as described for FIG. 1A. This forms an elongated lateral gap 24 along a side of the holder for eyeglass temple insertion. FIG. 2C in a top plan view and FIG. 2D in a side plan view depict a fifth embodiment of temple holding means 16. Temple holding means 16 is comprised of compressible supporting elements 56 extending horizontally along a generally rectangular plate 54 and base 14. Compressible supporting elements 56 form lateral gaps 24 along a side of the holder for eyeglass temple insertion. Compressible supporting element 56 is preferably rubber, although various other materials may be used such as foam wrapped by plastic. Plate 54 and base 14 are forced together by an urging means 42 comprising of a torsion spring 46 pivotally mounted on a shaft 44. Shaft 44 is received through holes in fastening lugs 48 that are attached to base 14 and plate 54. Shaft 44 may be secured by means of a locking ring 52. Temple holding means 16 may by opened for insertion of the eyeglass temples through the lateral gaps 24 by either pressing on plate 54 near shaft 44, or lifting plate 54 near gaps 24.

Figure 2D:
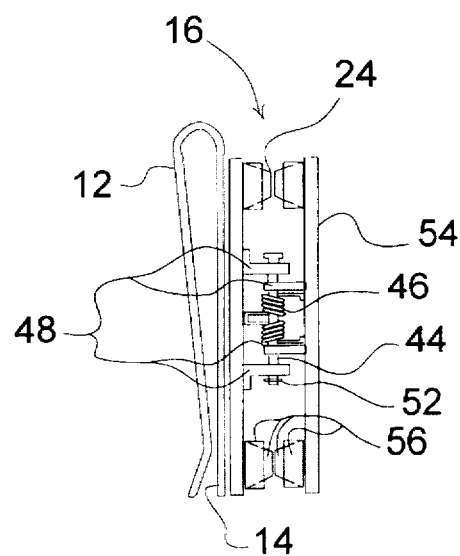
Figure 2E:
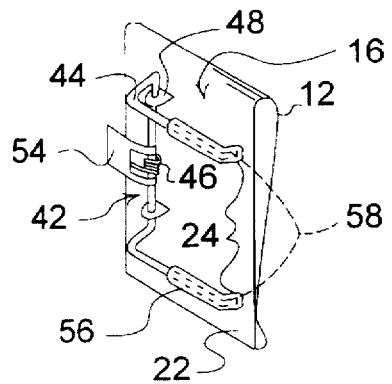

FIG. 2E depicts in a perspective view an alternate embodiment of temple holding means 16 of FIGS. 2C and 2D whereby each end 58 of shaft 44 is extended perpendicularly from urging means 42 along the width of face 22 ending at the opposite side on face 22. This forms lateral gaps 24 located on a side of the holder for eyeglass temple insertion. Shaft 44 may be encased by a compressible supporting element 56 to prevent scratching of the eyeglass temples if a rigid material, such as metal, is used to form shaft 44. Plate 54 is secured to shaft 44 providing resistance to torsion spring 46. Operation of holder in FIG. 2E is performed by either pressing on plate 54 or lifting shaft ends 58.

The urging means of the present invention has been described as a torsion spring and shaft arrangement in the previous embodiments. However, an urging means may be constructed from numerous other devices to reap the benefits of this invention such as a leaf spring bent in a U-shape arrangement or a leaf spring bent in a V-shape and pivot arrangement. Further descriptions presenting these embodiments are common to the art and not deemed instructive.

Figure 3A:
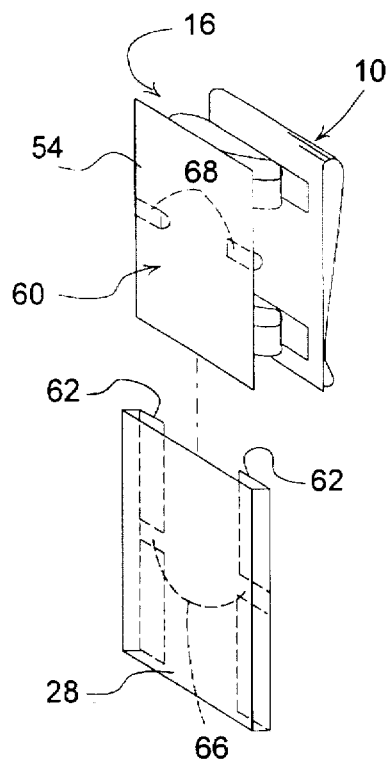
FIGS. 3A to 3B show an eyeglass holder with alternate embodiments of a cover.

FIG. 3A depicts an embodiment of a cover 28. Cover 28 is an ornamental object that comprises of parallel rails 62 and cut-outs 66 located underneath. A receiver 60, generally rectangular in shape, is attached to temple holding means 16. Edges underneath receiver 60 comprise of notches 68. Cover 28 is received by sliding rails 62 onto the edges of receiver 60 and temporarily secured when notches 68 are received by cut-outs 66.

Figure 3B:
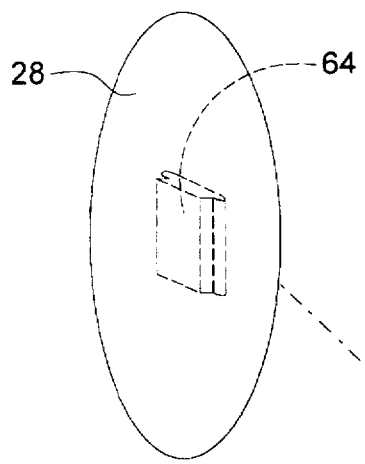
Figure 3B:
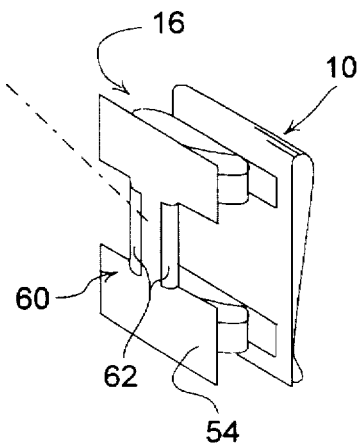

FIG. 3B depicts an alternate embodiment of cover 28. Cover 28 is a circular-shaped ornamental object with a snap 64 located underneath. Receiver 60 is bent H-shaped. Each end of the two longitudinal sections of receiver 60 are attached to temple holding means 16. The lateral section of receiver 60 has parallel rails 62 with curved edges. Cover 28 is temporarily attached to receiver 60 by snapping on snap 64 within rails 62 of receiver 60.

The attachment means for a cover onto a temple holding means has been presented as permanent, such as soldering, and releasable, such as a slide-on or snap-on arrangement. Numerous other cover attachment means may be employed to accomplish this interchangeable-cover advantage of the invention, such as: an adhesive pad arrangement; a releasable hinge and snap arrangement; or a flattened hook and detente arrangement. Further descriptions presenting these embodiments are common to the art and not deemed instructive.

The shapes, sizes, and designs of the cover and receiver arrangement are only limited by the imagination. The cover is an advantage of the present invention since the cover conceals the mechanical aesthetics of the holder and provides an area for inscriptions, logos, jewelry, and the like. A wearer may attach a diamond-shaped, gem-studded silver cover to aesthetically match a silver watch. The next day, the wearer may attach a gold, cat-shaped cover to match a set of gold earrings. Thus, the wearer may have several covers for various outfits and need only one eyeglass holder.

Although the descriptions above contain many specifications, these should not be construed as limiting the scope of the invention but as merely providing illustrations of the presently preferred embodiments of this invention.

What is claimed is:

1. A holder for supporting and securing objects such as eyeglasses, by encircling and/or grasping one or a plurality of temples, said holder formed from resilient material, said holder comprising:

a) a frontal elongate plate member essentially having a front face and a rear face, said frontal elongate plate member having essentially an upper edge, a lower edge, a left edge, and a right edge, said elongate late member being essentially flat;

b) a base member pivotally mounted on said frontal elongate plate member generally extending along rear face of said frontal elongate plate member in a parallel, spaced apart, face-to-face relationship therewith, said base member terminating near said edges of said frontal elongate plate member;

c) an urging means bearing mutually with said frontal elongate plate member and said base member for biasing an opposing edge of said frontal elongate plate member towards a corresponding opposing edge of said elongate base member whereby said frontal elongate plate member may be pressed on a frontal side opposite of said opposing edge of said frontal elongate plate member producing a substantially spaced apart gap between said opposing edge of said frontal elongate plate member and said corresponding opposing edge of said elongate base member for receiving one or a plurality of said eyeglass temples whereby releasing said pressure from said frontal side of said elongate plate member urges said opposing edge of said frontal elongate plate member towards said corresponding opposing edge of said elongate base member securely encircling and/or grasping said temples of said eyeglasses;

d) a compressible material defining two linear members of constant thickness secured to the base and plate members so as to define a gap therebetween with two additional facing compressible members which are thicker than the linear compressible members and positioned at the free ends of the base and plate members so as to maintain the said gap; and, e) an article attachment means comprising of a side generally planar attached to said base member on a side opposite to said frontal elongate plate member to attach said holder to clothing and the like.

2. The holder of claim 1 wherein said article attachment means is a spring clip comprising of a generally planar leg extending in a U-shaped direction abreast and concentric to one face of said planar leg and transversely arcuate at the mouth to facilitate inserting securely and removably attaching of a garment or similar object whereby said generally planar leg is attached to said base member on a side opposite to said frontal elongate plate member.

3. The holder of claim 1 wherein said rear face of said frontal elongate plate member and a corresponding opposing face of said base member comprise of a horizontally attached removably-attachable compressible supporting element whereby said compressible supporting element prevents jiggle of a wide range of eyeglasses having a varying range of temples.

4. The holder of claim 1 wherein said frontal elongate plate member and said base member each comprise a corresponding pair of concentric holes through which a pivot shaft is inserted to mount said frontal elongate plate member onto said base member.

5. The holder of claim 4 wherein said shaft extends perpendicularly from said urging means along said base member in a parallel, spaced apart manner and angling towards said base member at the ends of said shaft.

6. The holder of claim 1 wherein said urging means is a torsion spring bearing mutually against said frontal elongate plate member and said base member for biasing said opposing edge of said frontal elongate plate member towards said corresponding opposing edge of said base member.

* * * * *